Aug. 6, 1935.  F. NIELSEN  2,010,462
AUTOMOBILE CENTERING MEANS
Filed May 24, 1935
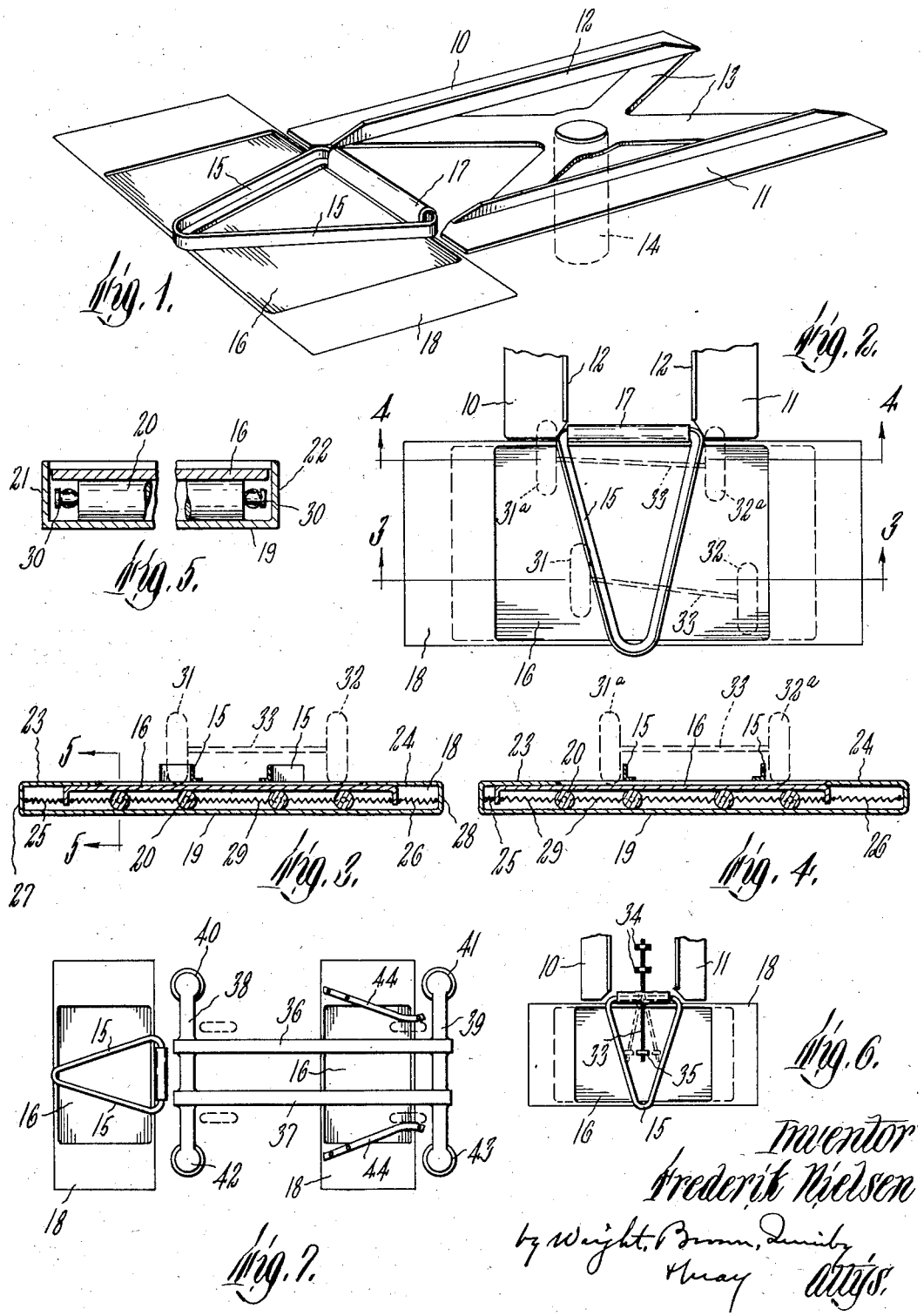

Patented Aug. 6, 1935

2,010,462

UNITED STATES PATENT OFFICE 2,010,462

AUTOMOBILE CENTERING MEANS

Frederik Nielsen, Quincy, Mass.

Application May 24, 1935, Serial No. 23,205

9 Claims. (Cl. 254—89)

This invention is related to the contrivances used in service stations for automobiles to facilitate access of workmen to parts beneath the body of the car. Such contrivances include pits in the ground designed to be straddled by the wheels of a car and into which workmen may enter, and elevators of various kinds by which the car is raised above the ground level high enough for the men to walk under it. Some types of elevators are equipped with tracks or runways for the wheels of the car, and by which the car is supported. Others include bars or equivalent supports designed to engage the under sides of the axles when raised after the car has been positioned over them, and by which the car is lifted. Tracks or runways are also provided in connection with open pits, being arranged lengthwise of the opposite long sides of the pit and provided with raised flanges to avoid danger of either side of the car falling into the pit.

In all these circumstances it is essential that the car be properly alined or centered with respect to the wheel runways or lifting members of other types. As accurate a centering as possible with the lifting members of elevators is highly important, in order to permit convenient access of the workmen to all under parts of the car which may need attention, and to distribute the weight of the car symmetrically with respect to the lifting means. When such elevators have tracks or runways for the wheels of a car, placement of the car to one side or the other of central position may cause obstruction of some of the points to which the workman must have access, such as the lubrication nipples at one side or the other, or the steering column and connections, for the runways are always made wider than is required for merely supporting the car in order to facilitate driving the car upon them. And with all types of elevator, placement of the car too far to either side brings its weight out of equilibrium with the lifting means; which in the case of a heavy truck may bend or spring some part of the lifting structure.

But it is difficult for drivers to maneuver their cars into the necessary alinement with the trackways or lifters of the types herein referred to, particularly when the space available for maneuvering in front of the pit or elevator is limited and if the driver is nervous. It is for this reason that the wheel runways are always made with excess width over what would serve if the car were accurately alined. So it usually happens that when a car is placed on or over an elevator or pit it is not accurately centered.

The purpose of the present invention is to enable a car to be brought into correct alinement with such contrivances quickly and easily, even by unexperienced or careless or nervous drivers, and to be centered more accurately than is otherwise possible except accidentally or by the exercise of exceptional care by the most skillful of operators.

The invention comprises deflecting means in association with tracks or lifters and a movable platform or the like located to support the car wheels when in contact with the deflector and capable of being moved laterally by and with the wheels of the car acting against the reaction of the deflector. These in principle constitute the main factors of all embodiments of the invention, with which accessory parts may be used and of which many various forms may exist. Some illustrative embodiments are shown in the drawing, in which,—

Fig. 1 is a perspective diagrammatic view of one of the common forms of car elevator with my alining device in operating association;

Fig. 2 is a plan view of the alining device and of the adjacent end of the trackways of the elevator, shown in Fig. 1;

Figs. 3 and 4 are cross sections taken on lines 3—3 and 4—4 respectively of Fig. 2;

Fig. 5 is a fragmentary longitudinal section taken on line 5—5 of Fig. 3 and shown on a larger scale;

Fig. 6 is a view similar to Fig. 2, but on a smaller scale, and illustrating an alternating type of spring means for centering the deflectable platform;

Fig. 7 is a plan view of another embodiment of the invention in connection with an elevator of the type which lifts and supports cars by their front and rear axles or axle housings.

Like reference characters designate the same parts wherever they occur in all the figures.

In Figs. 1 and 2, the numerals 10 and 11 designate trackways such as are provided with some types of elevators for supporting the wheels of a car and lifting the car. They are usually made of steel bars of angle or channel section having a horizontal web portion considerably wider than the width of a wheel tire and an upright flange 12 usually at the inner edge of the web portion, but sometimes at both edges thereof, to insure that the wheels will not run off the trackways or either of them in traveling along them. Such runways are connected by means of connecting structure 13 of any suitable character (here shown in a highly conventionalized form) with a lifting plunger 14 movable lengthwise in a hydraulic cylinder set into the ground. Similar tracks or runways are used with pits in the ground, being placed alongside the longitudinal edges of the pit at the proper distance apart to receive the wheels of the car, and with their flanges suitably located to prevent either front wheel from falling into the pit, once these wheels have been correctly alined with the trackways.

It is to be understood that the foregoing brief description is intended to indicate in a general way the type of contrivances with which this invention is concerned, and to typify all such contrivances without limitation as to specific characteristics of any of them.

The new features of the invention reside in a deflector 15 and a laterally movable wheel supporting structure 16, or equivalents thereof, together with necessary accessory parts for enabling the platform to move in the lateral directions only and to hold it normally in a given position and restore it to such position after having been displaced. Many different specific forms and constructions of deflector may be used for the purpose. One form includes essentially two members, both here indicated by the numeral 15, which extend convergently from the entrance ends of the two trackways out for a sufficient distance in front of the trackways. Their ends adjacent to the trackways are separated from one another by substantially the full distance between the wheels, both front and rear, of the automobile. In other words, their separation at their rear ends is substantially equal to the inside gauge of the automobile wheels. And they are symmetrically arranged with respect to the flanges of the trackways, extending to equal distances outside of the line of the adjacent track flanges. They extend forwardly, preferably making equal and respectively opposite angles with the trackways to points where their forward ends are much nearer together than the width of the wheel gauge. Considerable variation is possible in the degree of the angles between these deflecting members and the trackways, provided only that the angle is oblique enough to permit sliding movement of the wheel along the deflector in the manner later described. Suitable inclinations are those shown in Fig. 2.

The deflectors are also long enough to bridge across the platform 16, being supported at their opposite ends in front and rear of such platforms. But within this limitation there is considerable scope for variation, as the limits of length of the platform are that, on the one hand, it must be long enough to permit deflection of the wheels in the manner later described and, on the other hand, it should be shorter than the wheel base length of the cars for the service of which it is provided. That is, the front wheels of the car should run off the platform before the rear wheels enter upon it. Furthermore, the deflectors must be placed, or rise, high enough above the platform, and be suitably formed, so as practically to overcome any tendency of a wheel to mount or ride over them when first coming into contact with one or the other of them at an abrupt angle. Within these limiting conditions the deflectors may be of any desired specific construction. I have here shown them in a diagrammatic way, and for illustration, as both made from a single length of angle bar stock, the ends of which at their divergent parts are turned toward one another and confined in a stationary housing 17. Such housing typifies any means for holding the deflectors against displacement, which may be secured to the foundation of the elevator, or to some part of the frame 18 in which the platform is confined and has its movement. The abutments by which the deflectors are supported so as to bridge over the platform may be members of the same frame, or anything else suitable for the purpose.

In the drawing the frame 18 is shown as having a bottom 19 (Figs. 3, 4 and 5) on which rollers 20 are freely supported, which in turn support the platform. The rollers are arranged lengthwise of the trackways, so that they can roll freely transversely thereof, and are confined between front and rear walls 21 and 22 of the frame to prevent any substantial endwise displacement. These front and rear walls, by the way, may provide the supporting abutments for the deflectors. Top members 23 and 24 of the frame adjacent to the opposite sides thereof overlap the sides of the platform to guard and protect it. Springs 25 and 26 confined between side walls 27, 28 respectively of the frame, and adjacent flanges on the platform, normally hold the platform in approximately a central position and return it after displacement from such position in either direction. Spacing links 29 are engaged with trunnions 30 on the opposite ends of the rollers and connect adjacent rollers with one another and the outermost rollers with the end flanges of the platform, for the purpose of holding the rollers in approximate parallelism and maintaining approximately the same spacing between them under all conditions. I have found that if these links are made as springs, wholly or in part, having capacity for elastic extension and compression, and of suitable stiffness, better results are secured, and more flexibility in the action of the rollers, than when the links are of rigid character.

The frame or housing here described comprises all necessary elements for supporting a platform with capacity for free movement back and forth laterally, and for movement only in those directions. It typifies various possible means and structures for this purpose. It may be set into the ground or a foundation structure deeply enough to locate the platform substantially at the ground level, or at such other level as will permit the wheels to roll on and off the platform without lifting or dropping objectionably.

The manner in which this device operates is shown diagrammatically in Figs. 2, 3 and 4. The dotted outlines at 31 and 32 represent the front wheels of a car approaching the trackways from a direction very much out of line. The representation at 33 of the front axle illustrates a very great misalinement of the car as a whole and indicates a position from which the car could not possibly pass to the trackways without backing and maneuvering. But with the aid of the deflector and platform, it may run directly on the trackways, without any maneuvering. The left hand deflector, on being engaged by the wheel 31, serves as an abutment, the wedging reaction of which causes the wheel and the platform to be deflected sidewise. Both front wheels, being on the platform at the same time, are thus deflected sidewise while rolling across the platform from front to rear until, when they leave the platform, immediately after reaching the positions shown at 31a and 32a, they are symmetrically placed with respect to the line midway between the trackways. The whole front end of the car is thus bodily swung to one side. When the front wheels leave the platform, the latter is returned to normal position by its centering springs 25 and 26. The rear wheels enter upon the platform soon after, and if the rear end is then at the left of the correctly alined position, the right rear wheel, then engaging the right deflector, is caused by the latter to shift the platform and the whole rear end of the car to the right into correctly centered position by the time the rear wheels reach the trackway. A similar but opposite effect takes place when a car approaches the tracks from the right hand side at an inclination. It may happen that both the front end and rear end need to be swung in the same direction, depending on the inclination of the car as it approaches the platform; but whatever the errors of alinement may be, they are automatically corrected by the deflector and platform under the tractive force exerted by the driving wheels of the car. Owing to the use of rollers, extending in the direction of travel of the car, to support the platform, there is no loss of tractive force and no displacement of the platform rearwardly, when the driving wheels of the car rest upon it, and the movements are practically frictionless.

The variation shown in Fig. 6 comprises a different form of spring for centering the platform. This spring, designated 33, is of the bar or leaf type. It is anchored immovably at and near one end by clamps 34 outside of the platform, and its free end is coupled to the platform by an eye 35, or other equivalent point connection. Deflection to either side of the mid position (shown by solid lines) is permitted to the extent indicated by the dotted lines at either side of such mid position.

Fig. 7 illustrates the application of the invention to an elevator of the type having lifter members 36 and 37 arranged to underlie and engage the front axle and the rear axle housing of the car, which are connected with transverse members 38 and 39 supported by lifter bars or posts 40, 41, 42, 43, which are raised and lowered in unison by motive mechanism. This is a type of elevator now well known and used to a considerable extent. Deflectors 15 and a platform 16, substantially like the elements previously described, are provided adjacent to the front end of the elevator (that is, the end first approached by the car). They center first the front end and then the rear end of the car suitably with respect to the forward part of the elevator. Adjacent to the rear part of the elevator is a second platform 16 associated with deflectors 44 which extend over the platform from points of connection with the housing or frame thereof at the sides of the platform and are inclined so as to engage the outer side of one or the other of the car wheels. The distance between the nearest points of these deflectors is substantially equal to the external gauge of the wheels. Thus the front end of the car is restored to correctly centered position in case it should have shifted to either side of center in running the length of the elevator.

It will be appreciated from this last description that the deflectors may be arranged to engage either the inner sides or the outer sides of the car wheels. Indeed either type of deflector may be used in connection with any of the elevators or trackways.

What has been said herein with respect to alining the car with the trackways, as 10 and 11, of an elevator, applies equally to use with the trackways at the sides of a pit.

The term "centering", and equivalent terms, used in describing the effects secured by this invention, are not to be construed as limiting these effects to an exact coincidence of the center line of the car with the center line of the elevating apparatus. What is meant rather is any prescribed or desired location of the car with respect to the supports. That is, the center of gravity of the car rather than its geometric center line may be thus centered with respect to an elevator.

The effect of the means embodying this invention is great enough to take care of ordinary misalinements of a car in approaching a pit or elevator. That is, a driver who is competent to turn a car from the street into a driveway can, with the aid of this device, bring the car over a pit or on an elevator directly and without preliminary backing and maneuvering. If the car is out of line by as much as 20° (and of course at any smaller angle) when both front wheels pass on to the platform and one of them engages one of the deflectors, it will be straightened by this apparatus. A car may even be backed and centered on a track or elevator, with little difficulty; a thing which is extremely difficult under previous conditions.

While I have described the invention in connection with trackways and other means or contrivances for enabling workmen to obtain easy access to the under parts of a car, it is to be understood that such description is not necessarily a limitation on the utility of the invention or the scope in which I claim protection for it. The invention is applicable to all situations where centering or alinement of a car is desired with a location or berth designed for its reception as, for instance, in garages and parking spaces. For purposes of generic definition I will use the term "berth" as designating all such locations or positions, including not only the specific trackways and elevators hereinbefore described, but also parking places, etc.

Although it has been stated as preferable that the platform be shorter than the wheel base of the car, nevertheless it would not be a departure from the invention, or from the protection claimed, to make it longer; long enough to support both front and rear wheels at the same time. If, in such a case, the rear end of a car should be shifted laterally by displacement of the platform as described, yet after the front wheels have left it, the platform is free to move in either direction by the coaction of either rear wheel with one or the other of the deflectors so far as necessary to center the rear end of the car; and is under tendency to return to its neutral position by virtue of the centering springs.

What I claim and desire to secure by Letters Patent is:

1. The combination with a berth for the reception of an automobile, of means for alining an automobile with such berth which consists in a deflector in position to be engaged with one of the advancing wheels of a car approaching the berth out of alinement therewith, and a support so located that said advancing wheels roll upon it when coming into such engagement with the deflector, said support being movable transversely of the line of travel of the car whereby, under the reaction of the deflector, it causes the advancing end of the car to be swung bodily sidewise.

2. An apparatus for alining an automobile with a receiving berth comprising a deflector inclined to the longitudinal line of said berth and having one end close to the entrance to the berth, and constructed to make contact with the side of a wheel at a height above the ground sufficient to exert substantial deflecting tendency on an advancing wheel, and a laterally movable platform positioned beneath said deflector to support the advancing wheels of the car at the same time that one of said wheels engages the deflector.

3. Deflecting means for bringing a car into centralized relation to a berth designed for its reception, comprising a platform at substantially the ground level adjacent to one end of such berth, of width and length sufficient to receive both wheels at the advancing end of the car, but of less length in the direction of the advancing movement of the car than the wheel base of the car, the platform being mounted with capacity for movement freely in directions transverse to such car movement, and a deflector immovably supported over the platform in position to engage the side of an advancing wheel of the car, when out of the desired alinement with such berth and when such wheel is on the platform, whereby to swing the car into prescribed alinement with the berth by its reaction and the movement of the platform.

4. A car alining apparatus comprising deflectors inclined to one another in position to be straddled by the advancing wheels of a car and having their most widely separated parts at a distance from one another equal substantially to the inside gauge of such wheels, and being high enough above the ground level to resist tendency of such wheels to mount over them, and a platform extending beneath said deflectors, having dimensions large enough to support both advancing wheels of an automobile at the same time, said platform being supported with capacity for movement transversely of the median line between the deflectors, but not in the direction of such median line.

5. An automobile alining apparatus comprising deflectors inclined to one another in position to receive the advancing wheels of an automobile between them and being separated at their least distance from one another by substantially the outside gauge of such wheels, and a platform of dimensions suitable to receive both advancing wheels of the car at the same time and being mounted with capacity for movement beneath said deflectors in directions transverse to the median line between the deflectors but not in the same direction as such line.

6. A car alining device comprising a platform mounted substantially at ground level and of dimensions large enough to support both the front or the rear wheels of a car at the same time, rollers on which said platform is supported arranged to permit substantially frictionless movement of the platform in the width dimension but not in the length dimension thereof, and deflectors bridging across said platform in the general direction of the length dimension thereof but at respectively opposite inclinations to such length dimension.

7. A car alining device comprising a platform mounted substantially at ground level and of dimensions large enough to support both the front or the rear wheels of a car at the same time, rollers on which said platform is supported arranged to permit substantially frictionless movement of the platform in the width dimension but not in the length dimension thereof, and deflectors bridging across said platform in the general direction of the length dimension thereof but at respectively opposite inclinations to such length dimension, said deflectors being separated from one another at one end by a distance substantially equal to the wheel gauge of an automobile.

8. An automobile alining apparatus comprising a platform approximately at ground level mounted with provision for back and forth movement in one direction only, and adapted to be passed over by the two wheels at one end of an automobile in a direction transverse to its line of movement, a deflector extending across said platform at an inclination to such line of movement adapted to be engaged by one of such wheels, and resilient centering means connected with the platform normally holding it in central position and adapted to restore it to such position after having been deflected by the reaction of an automobile wheel engaging said deflector.

9. A car alining device comprising a platform mounted substantially at the ground level, parallel rollers supporting said platform and enabling it to move in directions perpendicular to said rollers while preventing its movement in the longitudinal direction thereof, spring means connected with the platform and arranged to hold it normally in an intermediate position while permitting resisted movement to either side from such position, and a deflector extending across a part of said platform at an inclination to the line of possible movement of the platform.

FREDERIK NIELSEN